Sept. 22, 1970  CHONG Y. YOON ET AL  3,529,938
CRYSTALLIZATION OR LEACHING DEVICE
Filed Oct. 6, 1967
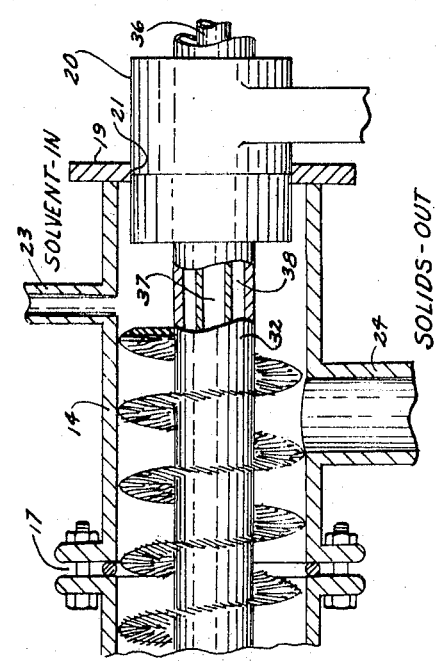
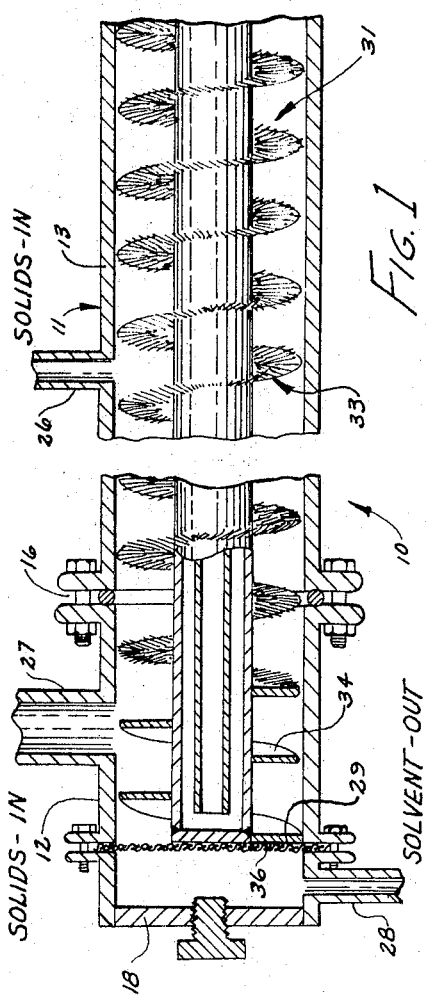
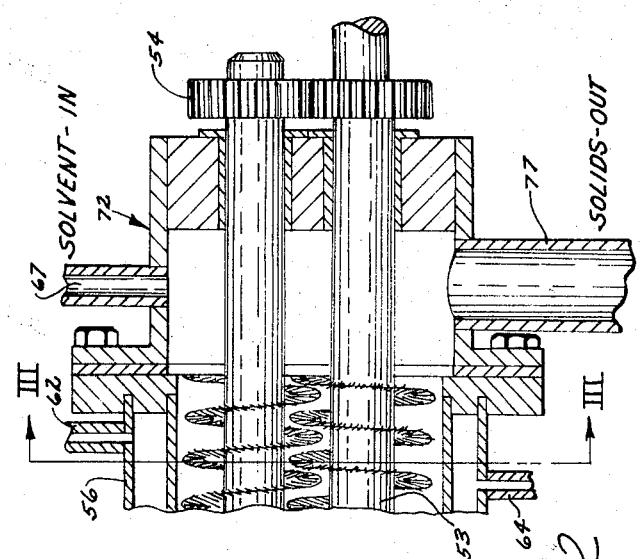
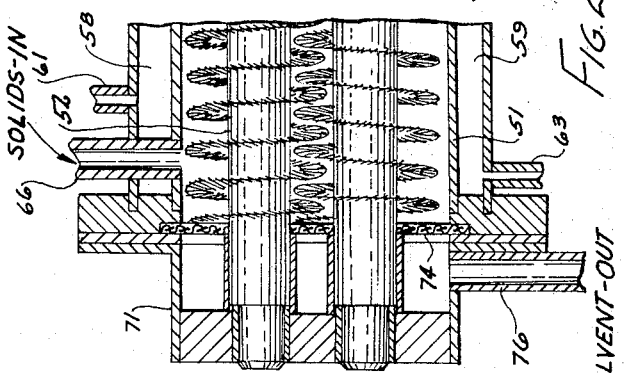
INVENTORS
CHONG Y. YOON
ROBERT E. MELSON
BY
Woodhams, Blanchard & Flynn
ATTORNEYS United States Patent Office 3,529,938
Patented Sept. 22, 1970

3,529,938
CRYSTALLIZATION OR LEACHING DEVICE
Chong Y. Yoon, Kalamazoo, and Robert E. Melson, Portage, Mich., assignors to The Upjohn Company, Kalamazoo, Mich., a corporation of Delaware
Filed Oct. 6, 1967, Ser. No. 674,381
Int. Cl. B01d 9/02, 11/02
U.S. Cl. 23—270                                   7 Claims

ABSTRACT OF THE DISCLOSURE

Apparatus for separating components of a mixture of chemicals in which a selective liquid solvent is fed through a treating zone countercurrent to the mixture of chemicals in such a fashion that a multistage leaching or solvent crystallization operation is carried out.

---

This invention relates to an apparatus for separating components of a mixture of chemicals. More specifically, this invention relates to an apparatus as aforesaid in which the separation is carried out by a multistage, countercurrent leaching or crystallization procedure which preferably is of a continuous nature.

A procedure for separating solid components of a mixture of solids using a selective solvent involves mixing the solvent with the mixture of solids, either (1) to dissolve a part of the solids in the solvent by leaching, or (2) to dissolve all of the solids in the solvent following which the resulting solution is cooled to precipitate a portion of the dissolved solids. In both cases there is produced a liquid phase and a solid phase and, due to the preferential solubility of a component or components of the mixture in the solvent, one of these phases is enriched with the component or components it is desired to recover from the mixture. The two phases are separated from each other and this is commonly referred to as a "stage." A mixing step and a settling step together comprise a leaching or crystallization stage. It is common to use a plurality of stages and to have the solvent flow through these stages countercurrent to the flow of the solid material. Procedures of this type are well known and do not require further explanation.

It is well understood that the solids must be brought into intimate contact with the solvent in order that the efficiency of the leaching or crystallization operation will be as high as possible. Many such operations are carried out on a batch basis because same makes it possible to obtain carefully controlled operating conditions, such as time of contact, ratio of solvent to solids and efficient mechanical separation of the two phases, whereby high efficiencies are obtained. However, it is desired for well-understood reasons to carry out a multistage, countercurrent leaching or crystallization procedure on a continuous basis.

It has been suggested in the prior art to provide a continuous crystallization procedure in which a screw is used to advance the solid feed material through an elongated casing in one longitudinal direction and simultaneously the melt is caused to flow in the opposite longitudinal direction through the casing. The procedures suggested in the prior art, however, were primarily applicable for melt crystallization operations in which part of the solids components were melted and separated from the unmelted part of the solids to achieve enrichment. This is different from a leaching or crystallization operation in which a selective solvent is utilized to dissolve part of the solids to enrich certain component or components of the solids. Because of this difference, the prior art procedures have been found inapplicable to leaching or crystallization operations using a selective solvent. Many solids mixtures tend to form with a solvent, a very viscous slurry resembling a thick clay-like or jelly-like mass. In such slurries, the solids tend to stick together and/or the solvent does not flow freely countercurrent to the solids, whereby the desired intimacy of the contact between the solvent and the solids is not achieved. Moreover, it is difficult to move the solids forwardly in the casing. Consequently, the stage efficiency is so poor that this desirable procedure cannot be used with such solid materials.

An example of this difficulty in carrying out effectively a continuous, countercurrent, multistage solvent crystallization procedure occurs in the treatment of soy sterols in which it is desired to separate stigmasterol from sitosterols. It has not previously been possible to perform this separation efficiently in a continuous, multistage, countercurrent leaching or crystallization procedure because of the difficulties referred to above. Consequently, this separation has been carried out by batch-wise, countercurrent crystallization procedures. While such batch methods are effective, it is desired to carry out such a separation by a continuous procedure in order to obtain lower equipment and operating costs.

The specific reference above to a sterol separation procedure is mentioned for illustrative purposes only and the invention is not limited thereto. It will be apparent to persons of ordinary skill in the art that the hereinafter described invention will also be useful for effecting the selective separation of components of mixtures of other solids.

Accordingly, the objects of the invention include the following:

(1) To provide an improved apparatus for separating components of a mixture of chemicals by a multistage, countercurrent leaching or solvent crystallization procedure.

(2) To provide an improved apparatus as aforesaid in which the solids are maintained in a finely divided and agitated condition in order that same can achieve intimate contact with the solvent flowing countercurrent thereto.

(3) To provide an improved apparatus as aforesaid in which the means for moving the solids countercurrent to the solvent also includes means for breaking up any agglomerations of solids into relatively fine particles so that the solids can be moved smoothly and continuously countercurrent to the solvent in an effective fashion.

(4) To provide an improved apparatus as aforesaid in which the slurry may undergo repeated heating and cooling in order to obtain an increased mass transfer rate between the solids and the solvent by effecting precipitation of a portion of the dissolved solids near the cold zone as a portion of the undissolved solids become dissolved in the solvent near the hot zone.

(5) To provide an improved apparatus as aforesaid for carrying out a continuous multistage, countercurrent leaching or solvent crystallization operation which minimizes equipment and operating costs and which provides improved output capacity.

(6) To provide an improved apparatus as aforesaid for carrying out a multistage, countercurrent leaching or solvent crystallization operation either in a continuous manner or in a cyclic manner, depending on whichever operating manner is more economical overall.

Additional objects and advantages of the invention will become apparent to persons acquainted with apparatus of this type upon reading the following description and inspecting the accompanying drawings, in which:

FIG. 1 is a central longitudinal sectional view through one embodiment of apparatus according to the invention.

FIG. 2 is a corresponding central longitudinal sectional view of a modified apparatus.

FIG. 3 is a sectional view taken along the line III—III of FIG. 2.

GENERAL DESCRIPTION

The apparatus according to the invention is particularly adapted for performing a process for separating componets of a mixture of chemicals in which a solid feed material comprising the mixture whose components are to be separated is fed into a treating zone and a selective liquid solvent is also fed into the treating zone at a position spaced from the inlet for the solid feed material. In a continuous operation, the solvent is fed essentially continuously while the feed material can be fed continuously or intermittently, depending upon the nature of the material being fed. Conveying means is provided within the treating zone to move the solid feed material in a direction countercurrent to the flow of the solvent through the treating zone. During its flow through the treating zone, the solvent becomes enriched with a selected component or components of the feed material because of the preferential solubility of such component(s) in the solvent as compared with the remaining component(s) of the feed material. The forwarding of the solid feed material countercurrent to the solvent is effected in such a fashion that the solid material is prevented from agglomerating or forming a relatively immovable gel with the solvent. Particularly, according to the invention, the conveying means in effect continuously propels separate discrete quantities of the feed material forwardly so that the material is prevented from agglomerating and is maintained in a subdivided condition. Further, according to the invention, the conveying of the feeding material is carried out in such a fashion that the feed material is projected into the solvent whereby an intimate contact occurs therebetween so that the extraction efficiency is materially improved. In leaching or solvent crystallization operations it is preferable for most feed materials that there be maintained across the treating zone a transverse or radial temperature gradient such that at least a portion of the components of the feed material tend to undergo a phase change as they continuously move through the temperature gradient while moving across the treating zone. It is preferred that this temperature gradient be maintained by internally cooling the entire length of the conveying means and heating the external surface of the casing which defines the treating zone or for some cases, by reversing the direction of the temperature gradient.

Because of the temperature gradient, a portion of the solids dissolved in the solvent is crystallized near the cold surface while a portion of the solids dissolves near the hot surface. This repeated dissolving and crystallizing of the solids as they move along the treating zone is effective in a well-understood manner to achieve multistage separations.

It will be noted that the process of the present invention does not require that the material be heated above the melting points of the solid components. Thus, the process can be carried out at temperatures substantially below the melting points of the solid components in order to avoid thermal degradation of the solid components.

The apparatus includes conveying means having flexible screw flight means thereon for advancing the solid materials countercurrent to the solvent. The screw flight means preferably is comprised of independently flexible bristles or filaments which are capable of independent resilient flexing with respect to each other and which are adapted to propel discrete quantities of the solid material along the treating zone.

DETAILED DESCRIPTION

Referring to FIG. 1, there is shown a leaching or crystallizing apparatus 10 according to the invention. The apparatus is comprised of a casing 11 which is here shown as being made of three elongated tubular sections 12, 13 and 14 which are connected together by flanged couplings 16 and 17. End plates 18 and 19 close the ends of the casing. The end plate 19 has an opening 21 therethrough for purposes to be described hereinafter.

A solvent inlet conduit 23 is connected to the casing section 14. A solids outlet conduit 24 also is connected to the casing section 14. It will be understood that suitable precautions are taken to insure that the solvent does not flow continuously directly from the conduit 23 into the conduit 24, such as by providing an intermittently operable solids discharge valve (not shown) of a conventional type in the conduit 24. An inlet conduit 26 for the solid feed material is connected to the casing section 13. The apparatus is constructed so that the spacing of conduit 26 from conduit 24 is such as to insure the desired separation of the components of the solid feed material during the time the feed material moves from the conduit 26 to the conduit 24.

The portion of the casing 11 between conduits 24 and 26 is the enriching section of the apparatus in which the solvent as it flows from right to left in FIG. 1 becomes progressively enriched with those components of the feed material that are more soluble in the solvent.

A further conduit 27 is connected to the casing section 12 and it serves as a solids recycle feeding opening. Another conduit 28 is connected to the casing section 12 to serve as an outlet for the solvent. A filter 29 is placed across the central opening of the casing section 12 between the conduits 27 and 28 to filter solids from the solvent before the solvent leaves the casing.

The section between the conduit 26 and 27 is the so-called stripping section of the apparatus in which a portion of the dissolved solids are stripped or removed from the solvent in order to improve the separation of the components of the feed material.

Although the foregoing description has referred to a combined stripping and enriching unit, it will be understood that the apparatus can be operated solely as an enriching unit in which case the feed material is fed in only through the conduit 26 or 27, depending on the amount of contact desired between the solvent and the feed material.

The filtering of the solvent can take place outside the casing in which case the solids recovered by filtration can be recycled to the casing with the other recycle feed material. Additional recycle feed material can also be obtained by concentrating the filtrate or precipitating a portion of the solids by cooling the filtrate outside of the casing. Also the casing section 12 can be cooled to a lower temperature relative to the rest of the apparatus to precipitate solids inside the casing in which case there need not be any recycle feed from outside the casing.

The casing 11 can be disposed in a horizontal, vertical or inclined position. It will also be understood that the solvent will be supplied under sufficient pressure that it will flow from the inlet 23 to the outlet 28.

The solid feed material is advanced from the solids inlet conduit 26 and recycle feed inlet 27 toward the solids discharge conduit 24 by a conveying device 31. The conveying device comprises a hollow shaft 32 which extends lengthwise in the casing and extends through the opening 21 in the end plate 19. The shaft 32 is supported for rotation by suitable stuffing box and bearing means 20 mounted in the end plate 19 and said shaft is connected to drive means of any suitable type for effecting rotation thereof. The stuffing box and bearing means are shown only schematically, and the drive means are not shown at all because all of these can be of any suitable type and form no part of the present invention.

A helical screw flight 33 extends outwardly from the shaft 32. The screw flight 33 has an end section 34 made of rigid material and which has a scraping edge 36 for scraping off solid materials that collect on the filter 29 whereby said solid materials can be picked up by the screw and fed toward the solids outlet conduit 24. The remainder of the screw flight 33 is comprised of a multiplicity of independent resiliently flexible filaments or bristles, each of which extends substantially radially from the shaft substantially into contact with the internal wall of the casing 11. The bristles can be attached to the shaft 32 in any convenient way. The cross-sectional thickness of the screw flight is comprised of several layers of bristles so that free passage of the solid materials through the screw flight is effectively prevented. However, the screw flight has sufficient porosity to permit the desired flow of the solvent through the flight. Thus, the screw flight serves as a filter for preventing substantial back flow of the solids while permitting smooth continuous movement of the solvent. The outer ends of the bristles extend substantially into wiping contact with the internal wall of the casing so that they dislodge any solid material adhering to said casing wall. It will be understood that the invention does not preclude the possibility that some of the bristles will not contact the internal wall of the casing provided that a sufficient number of bristles do contact said internal wall so that the desired removal of the solid material from said casing wall will be effected.

As the bristles move circumferentially along the internal wall of the casing, they will be repeatedly flexed by their contact with said wall and with particles of the solid material and their mutual contact with each other. Thus, at any instant there will be taking place the flexing of a multiplicity of bristles which can occur in a variety of directions but which, in general, causes a circumferential and/or axial movement of the solid particles toward the outlet conduit 24 for the solid particles. Also the solid particles will be moved in a direction having a radial inward component so that there is a substantial circulation of particles toward the center of the treating zone and a substantially uniform slurry is maintained.

If there is any tendency for the solid material to agglomerate or gel, the same will be effectively prevented because the bristles will engage any large size particles that form and will subdivide them. The projecting action of the bristles as they resiliently return toward their unflexed position will cause discrete quantities of the solids to be projected into the solvent. Further, the particles which tend to settle out of the solvent are continuously being projected back into the solvent thus assuring a substantially uniform suspension of solid particles in the solvent so that the mass transfer rate from the solids to the solvent is maintained relatively high.

The bristles can be made of any suitable material capable of resilient flexing and which is not appreciably soluble in the solvent or reactive with the solids. Stainless steel or Teflon bristles are suitable for many uses.

A tube 36 extends lengthwise through the shaft 32 and is spaced radially therefrom to provide an inner passageway 37 and an outer annular passageway 38. The tube 36 is open at its inner (leftward) end so that the passageways 37 and 38 are in free communication with each other. A heating fluid or a cooling fluid may be supplied to the tube 36 in order that the surface of the shaft 32 may be heated or cooled. Further, if desired or necessary, a heat exchange jacket (not shown) can be provided around the casing 11.

For the usual continuous leaching or solvent crystallization operation, a hot fluid, such as hot water, will be caused to flow through the tube 36 and thence through the passageway 38 whereby the external surface of the shaft 32 is heated, while the casing 11 is unheated or is externally cooled. Alternatively, the temperature gradient can be in the reverse direction. Thus, the slurry consisting of the solvent and the solid particles is continuously agitated so that portions of the slurry are moved from the hot side of the treating zone to the cold side of the treating zone and vice versa. The slurry becomes hotter as it moves toward the hot side of the treating zone so that the solubility of the solids in the solvent increases and additional solids dissolve therein. The slurry cools as it moves toward the cool side of the treating zone so that the solubility of the solids in the solvent decreases and some of the solids precipitate. This continual phase transistion of the solid material increases the mass transfer rate to an extent not normally obtainable by simple agitation of a slurry. At the same time, it enhances the selective enrichment by providing increased opportunities for the selective solvent to dissolve preferentially a selected component or components of the solid feed material.

It will also be understood that the apparatus can be used for carrying out a cyclic, batch-like operation in which, instead of continuously supplying solvent and continuously rotating the shaft, the supply of solvent and the rotation of the shaft can take place at selected intervals. Similarly, the supply of heating and/or cooling fluid can be carried out on a cyclic basis. For example, after the casing is filled with solvent and the appropriate amount of solid material is uniformly distributed therethrough, the casing can be heated to dissolve the solids and then the casing can be cooled to precipitate a part of the solids. Due to the selectively of the solvent, after such an operation is completed, the solvent will be richer in a given component or components than it was before, while the remaining solids will be richer in the remaining components of the original feed material. The shaft can then be rotated to advance the solid material and the solvent countercurrent to each other a selected distance. Then the heating and cooling operations can be repeated. If desired, the screw may be rotated during a portion of the heating and/or cooling cycles in order to assure an intimate contact between the solvent and the solids.

MODIFICATION

Referring to FIGS. 2 and 3, there is shown a modified apparatus comprising a hollow casing 51 which in cross section has the general outline of a figure 8. A pair of screws 52 and 53 are disposed in the upper and lower portions of the casing and are mounted for rotation therein. The screws 52 and 53 each have a screw flight defined by bristles or filaments as in the previously described embodiment of the invention. Alternatively, in an embodiment capable of meeting some, but not all, of the objects of the invention, the screws 52 and 53 may have flights of solid structure, made of either metallic or other suitable materials instead of bristles.

The flights of the screws 52 and 53 are of the same pitch but are in this embodiment of opposite hand. They are arranged so that they interfit with each other so that the bristles on one screw move closely adjacent and in substantially wiping contact with the core of the other screw whereby the solid particles are prevented from adhering to the cores of the respective screws and are maintained in a subdivided condition so that they form a substantially uniform slurry with the solvent. The screws are connected by gearing 54 and one of the screws is driven so that said screws are rotated in opposite directions with respect to each other. Of course, the screw flights can also be of the same hand, in which case the gearing is arranged so that the screws are rotated in the same direction.

The casing 51 is surrounded by a heat-exchange jacket 56 of substantially the same cross-sectional shape. The jacket 56 is divided by a wall 57 into a first heat-exchange zone 58 and a second heat-exchange zone 59, said zones surrounding respectively, the upper and lower portions of the casing. Conduits 61 and 62 are connected to the opposite ends of zone 58 and conduits 63 and 64 are connected to the opposite ends of zone 59 whereby a coolant fluid can be supplied to one zone and a heating fluid can be supplied to other zone, or coolant or heating fluid can be supplied alternately to both zones as may be desired for the purposes of the particular leaching or solvent crystallization operation to be carried out.

An inlet 66 for the solids is provided at one end of the casing 51. The casing 51 is closed at its ends by end caps 71 and 72. The end caps 71 and 72 have means of any suitable type for rotatably supporting the screws 52 and 53 and for sealing the casing against escape of solvent. A filter 74 is provided between the casing and end cap 71 for removing solid particles from the solvent before same exits from the casing. The end cap 71 has an outlet 76 for the solvent and the end cap 72 has an outlet 77 for the solids. The end cap 72 also has an inlet 67 for the solvent.

It will be noted that the embodiment of FIGS. 2 and 3 does not provide a stripping section. Such can be provided if desired in the same manner as disclosed in FIG. 1 or, alternatively, same can be provided by a separate piece of equipment. The shafts of the intermeshed screws may be hollow as in the embodiment described in FIG. 1 to permit utilizing the shafts as heat transfer surfaces. This arrangement for providing a radial temperature gradient is an alternative to the earlier described arrangement in which heat exchange zones 58 and 59 provide the transverse temperature gradient.

The operation of this embodiment of the invention is generally similar to the operation of the principal embodiment of the invention, although it will be noted that because of the dual screw arrangement an even more thorough agitation and subdivision of the feed material may take place. Particularly the interfitting of the screw flights prevents material from accumulating, and packing, between adjacent flights. Moreover, the heating and cooling of the contents of the treating zone can be carried in a variety of different ways in order to insure the most effective operation for the particular leaching or solvent crystallization procedure that is to be carried out.

The following example may be cited to demonstrate the advantages of the invention. It is to be understood that the invention is not limited to the details of the following example and that this example is given for purposes of illustration only and not of limitation.

EXAMPLE

A continuous solvent crystallization operation for separating stigmasterol from crude soy sterols was carried out using the apparatus disclosed in FIG. 1. In this example the crude soy sterol was fed into the apparatus through inlet conduit 27 and the other solids inlet conduit 26 was plugged. Thus, the treating zone operated only as an enriching stage and no stripping operation was performed.

The crude soy sterol has a composition as follows:

|  | Percent |
|---|---|
| Stigmasterol | 19.3 |
| Campesterol | 21.6 |
| Sitosterol | 59.1 |

The crude soy sterol was fed into the treating zone at a rate of about 7.5 grams per hour. A solvent consisting of 80% n-heptane and 20% $CHCl_3$ (by volume) was continuously fed into the inlet conduit 23 at a flow rate of between about 100 and 200 ml./hr. The temperature of the shaft 32 was maintained at a temperature of between about 35 and 60° C. and the external temperature of the casing 11 was maintained at a temperature of between about 15 and 25° C. The shaft 32 was continuously rotated at a speed between 20 and 120 r.p.m.

The solid product discharged through the outlet 24 had the following average composition:

|  | Percent |
|---|---|
| Stigmasterol | 43.1 |
| Campesterol | 14.8 |
| Sitosterol | 42.1 |

The liquid product discharged through the outlet 28 had the following average composition:

|  | Percent |
|---|---|
| Stigmasterol | 15.5 |
| Campesterol | 22.8 |
| Sitosterol | 61.7 |

While particular preferred embodiments of the invention have been described, the invention contemplates such changes or modifications therein as lie within the scope of the appended claims.

The embodiments of the invention in which an exclusive property or privilege is claimed are defined as follows:

1. An apparatus for separating components of a mixture of chemicals, comprising:
   an elongated casing defining an elongated treating zone having an inlet for solid material and an outlet for solvent adjacent one end thereof, and having an inlet for solvent and an outlet for solid material adjacent the other end thereof, the internal surface of said casing closely surrounding the hereinafter mentioned screw flight means and being imperforate between said inlet and outlet for solid material so that the solid material and the solvent can enter and leave said casing only through the respective inlets and outlets;
   rotatable conveying means disposed within said treating zone and extending from adjacent one end thereof to adjacent the other end thereof, said conveying means having continuous screw flight means extending at least from said solid material inlet to said solid material outlet for advancing the solid material from the inlet therefor to the outlet therefor, the portion of said screw flight means between said solid material inlet and said solid material outlet consisting essentially of a multiplicity of separate resiliently flexible filaments projecting away from the screw core and arranged thereon to form said screw flight means and extending substantially into contact with the imperforate internal surface of said casing, said filaments being capable of substantially independent resilient flexing with respect to each other in order to propel discrete quantities of the solid material along the treating zone, said screw flight means having a thickness of at least several filaments so that the solvent is filtered as it passes through the spaces between the filaments.

2. An apparatus according to claim 1, which said conveying means has a hollow core and including means for supplying a heat exchange fluid to said hollow core and for removing the heat exchange fluid therefrom.

3. An apparatus according to claim 1, which said solvent outlet is located downstream of said solid material inlet adjacent said one end of said casing, a screen extending transversely across said treating zone between said solvent outlet and said solid material inlet, said conveying means extending beyond said solid material inlet and having a rigid screw flight in the zone between and solvent outlet and said solid material inlet, said rigid screw flight having a scraping edge in close proximity to said screen for scraping off solid particles which accumulate thereon.

4. An apparatus according to claim 1, in which said casing has two longitudinally spaced inlets for solid material, said portion of said screw flight means extending past one solid material inlet substantially to the other solid material inlet.

5. An apparatus for separating components of a mixture of chemicals comprising:
   an elongated casing defining an elongated treating zone having an inlet for solid material and an outlet for solvent adjacent one end thereof, and having an inlet for solvent and an outlet for solid material adjacent the other end thereof, the internal surface of said casing closely surrounding the hereinafter mentioned intermeshing helical flights and being imperforate between said inlet and outlet for solid material so that the solid material and the solvent can enter and leave said casing only through the respective inlets and outlets;
   rotatable conveying means disposed within said treating zone and extending from adjacent one end thereof to adjacent the other end thereof, said conveying means comprising a plurality of parallel screws extending at least from said solid material inlet to said solid material outlet and having intermeshing helical flights for advancing the solid material from the inlet therefor to the outlet therefor, said flights on each screw extending substantially to the core of the adjacent screw for wiping from the core of said adjacent screw any solid material which accumulates thereon, the portion of each of said screw flights between said solid material inlet and said solid material outlet consisting essentially of a multiplicity of separate resiliently flexible filaments projecting away from the screw core and arranged thereon to form said helical flights and extending substantially into contact with the imperforate internal surface of said casing, said filaments being capable of substantially independent resilient flexing with respect to each other to propel discrete quantities of the solid material along the treating zone, said helical flights having a thickness of at least several filaments so that the solvent is filtered as it passes through the spaces between the filaments.

6. An apparatus according to claim 5, in which said flights comprise continuous members extending a substantial distance along said screws.

7. An apparatus according to claim 5, in which said flights are comprised of a multiplicity of separate resiliently flexible bristles.

References Cited

UNITED STATES PATENTS

| | | | |
|---|---|---|---|
| 2,547,577 | 4/1951 | Hamacher | 210—415 X |
| 2,713,009 | 7/1955 | Bruniche-Olsen | 23—310 X |
| 3,005,398 | 10/1961 | Sandler | 23—270 X |
| 3,117,031 | 1/1964 | Griffiths | 23—270 X |
| 3,142,589 | 7/1964 | Schaffer | 23—270 X |
| 3,235,338 | 2/1966 | Sibbersen | 23—270 X |
| 3,375,776 | 4/1968 | Dyson | 210—415 X |
| 3,379,312 | 4/1968 | Brown | 210—457 X |

FOREIGN PATENTS

| | | |
|---|---|---|
| 5,530 | 12/1905 | France. |
| | | (1st Addition 352,616) |
| 3,171 | 2/1910 | Great Britain. |

NORMAN YUDKOFF, Primary Examiner

S. J. EMERY, Assistant Examiner

U.S. Cl. X.R.

23—273, 310; 62—58